(12) United States Patent
Kim et al.

(10) Patent No.: US 9,544,160 B2
(45) Date of Patent: Jan. 10, 2017

(54) METHOD FOR ENHANCED UPLINK TRANSMISSION HAVING LOW PAPR IN LTE-BASED MOBILE COMMUNICATION SYSTEM

(71) Applicant: Electronics and Telecommunications Research Institute, Daejeon (KR)

(72) Inventors: Hee Wook Kim, Daejeon (KR); Kun Seok Kang, Daejeon (KR); Bon Jun Ku, Daejeon (KR); Do Seob Ahn, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 88 days.

(21) Appl. No.: 14/399,922

(22) PCT Filed: Dec. 11, 2012

(86) PCT No.: PCT/KR2012/010753
§ 371 (c)(1),
(2) Date: Nov. 7, 2014

(87) PCT Pub. No.: WO2013/168872
PCT Pub. Date: Nov. 14, 2013

(65) Prior Publication Data
US 2015/0103723 A1 Apr. 16, 2015

(30) Foreign Application Priority Data

May 8, 2012 (KR) .......... 10-2012-0048413
Nov. 5, 2012 (KR) .......... 10-2012-0124226

(51) Int. Cl.
*H04J 11/00* (2006.01)
*H04L 12/18* (2006.01)
(Continued)

(52) U.S. Cl.
CPC ......... *H04L 12/189* (2013.01); *H04B 7/18513* (2013.01); *H04B 7/18517* (2013.01);
(Continued)

(58) Field of Classification Search
USPC ........ 370/329, 328, 319, 344; 375/295, 299, 375/146, 259, 260, 267; 455/451, 102, 455/552.1, 426.1
See application file for complete search history.

(56) References Cited

U.S. PATENT DOCUMENTS 7,974,258 B2 * 7/2011 Holt .............. H04L 1/0003
370/344
2006/0285481 A1 * 12/2006 Lane .............. G06Q 50/22
370/208
(Continued)

FOREIGN PATENT DOCUMENTS

KR  10-2008-0021785 A   3/2008
KR  10-2009-0030191 A   3/2009

OTHER PUBLICATIONS

S.H. Nam et al., "Broadcasting and Communications Convergence Technology Trends via Satellite", Apr. 2010, ETRI.
(Continued)

*Primary Examiner* — Phuongchau Ba Nguyen

(57) ABSTRACT

Provided is a communication method for downlink transmission with a low peak to average power ratio (PAPR) and compatibility with long-term evolution (LTE)-based downlink transmission in an LTE-based mobile communication system in which the performance degradation may occur due to a high PAPR in multi-carrier transmission caused by non-linearity of a power amplifier in a base station including a satellite, to have the effects of supporting a terminal that reuses an existing terrestrial LTE chipset and a terminal that enables downlink reception with a low PAPR with no collision between the terminals, and of implementing an integrated satellite/terrestrial mobile communication system with a minimum change of an existing mobile communication system to ensure economic efficiency.

14 Claims, 7 Drawing Sheets

(51) Int. Cl.
*H04W 4/06* (2009.01)
*H04L 27/26* (2006.01)
*H04B 7/185* (2006.01)
*H04L 5/00* (2006.01)
*H04L 12/58* (2006.01)

(52) U.S. Cl.
CPC ....... *H04B 7/18563* (2013.01); *H04L 5/0007* (2013.01); *H04L 5/0051* (2013.01); *H04L 5/0053* (2013.01); *H04L 27/2602* (2013.01); *H04L 27/2614* (2013.01); *H04L 51/10* (2013.01); *H04W 4/06* (2013.01); *H04L 5/0037* (2013.01)

(56) References Cited

U.S. PATENT DOCUMENTS

| | | | | |
|---|---|---|---|---|
| 2010/0260154 | A1* | 10/2010 | Frank | G01S 5/10 370/336 |
| 2010/0287593 | A1* | 11/2010 | Sayadi | H04L 1/1812 725/62 |
| 2011/0103286 | A1* | 5/2011 | Montojo | H04W 48/08 370/312 |
| 2011/0134968 | A1* | 6/2011 | Han | H04L 27/2627 375/146 |
| 2012/0063370 | A1* | 3/2012 | Worrall | H04W 74/006 370/280 |
| 2012/0327830 | A1* | 12/2012 | Hamaguchi | H04J 11/003 370/311 |
| 2014/0016596 | A1* | 1/2014 | Kim | H04L 5/001 370/329 |
| 2015/0103723 | A1* | 4/2015 | Kim | H04W 4/06 370/312 |

OTHER PUBLICATIONS

H.W. Kim et al., "Development Trend and Prospect of Personal Portable Satellite Communication/Broadcasting Service", Jun. 2008, ETRI.

International Search Report for PCT/KR2012/010753 filed on Dec. 11, 2012.

* cited by examiner

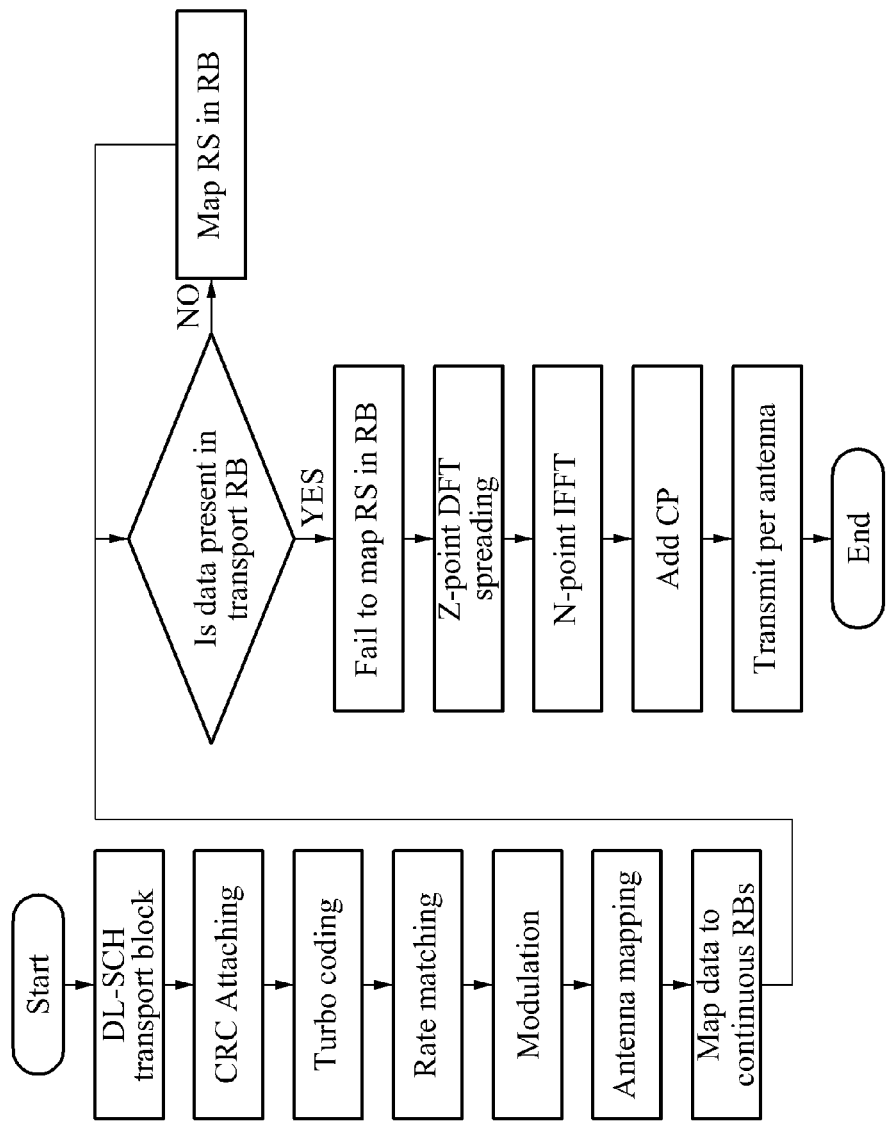

METHOD FOR ENHANCED UPLINK TRANSMISSION HAVING LOW PAPR IN LTE-BASED MOBILE COMMUNICATION SYSTEM

TECHNICAL FIELD

Exemplary embodiments relate to a communication method for downlink transmission with a low peak to average power ratio (PAPR) and compatibility with long-term evolution (LTE)-based downlink transmission in an LTE-based mobile communication system in which the performance degradation may occur due to a high PAPR in multi-carrier transmission caused by non-linearity of a power amplifier in a base station including a satellite.

The present disclosure is based on results of research conducted by the broadcasting communication infrastructure original technology development project of the Korea Communications Commission [KCA-2012-12-911-01-201, development of technology for optimal usage of 2.1 GHz satellite frequency band for terrestrial mobile communication]

BACKGROUND ART

Exemplary embodiments relate to a communication method for downlink transmission with a low peak to average power ratio (PAPR) and compatibility with long-term evolution (LTE)-based downlink transmission in an LTE-based mobile communication system in which the performance degradation may occur due to a high PAPR in multi-carrier transmission caused by non-linearity of a power amplifier in a base station including a satellite.

LTE-based downlink transmission is based on orthogonal frequency division multiplexing (OFDM). OFDM is an attractive downlink transmission scheme in many aspects. In particular, OFDM is robust to frequency selective channel conditions because of a relatively long OFDM symbol and a cyclic prefix (CP). Principally, a loss of signal caused by a frequency selective channel may be resolved by an equalizer at a receiving end. However, in a case of a terminal operating at a bandwidth greater than 5 megahertz (MHz), the equalizer may experience an excessively increasing degree of complexity. Since OFDM is inherently robust to frequency selective channel conditions, OFDM is particularly suitable for downlink transmission in a bandwidth greater than 5 MHz. In an LTE uplink, discrete Fourier-transform spread (DFTS)-OFDM single carrier transmission is used. The reason for single carrier modulation being used in an uplink is due to a lower PAPR of a transmitted signal than multi-carrier transmission, such as, OFDM. As a PAPR of a transmitted signal becomes lower, an average transmission power in a given power amplifier increases. Accordingly, single carrier transmission ensures a higher efficiency of a power amplifier, and this leads to increased coverage and reduced power consumption of a terminal.

In an LTE-based terrestrial mobile communication system, OFDM is used in a downlink relatively insensitive to a PAPR by the support of a power amplifier having a relatively high performance since OFDM is sensitive to a PAPR but flexible in frequency domain resource allocation, and DFTS-OFDM is used in an uplink sensitive to a PAPR by the use of a power amplifier having a relative low performance in a context of a terminal overhead even though DFPS-OFDM has many limitations in resource allocation for maintaining the single carrier properties. When compared to a terrestrial mobile communication system, a satellite mobile communication system is less concerned about frequency domain resource allocation because of frequency non-selective satellite channel properties, and experiences performance degradation caused by non-linearity of a satellite power amplifier in multi-carrier transmission in downlink since the power amplifier is very sensitive to a PAPR. In this instance, single carrier transmission is more effective for a satellite mobile communication system sensitive to a PAPR to improve the performance than multi-carrier transmission due to non-linearity of a power amplifier in a base station.

As a future mobile communication network is expected to evolve into a combination or cooperation of a terrestrial network and a satellite network, commonality between a satellite radio interface and a terrestrial radio interface is a primary consideration when implementing an integrated satellite/terrestrial mobile communication system, with a terminal overhead being taken into account. Particularly, in a circumstance in which an LTE-based terrestrial mobile communication system is given consideration as a next-generation international mobile telecommunications (IMT)-Advanced system, when a radio interface of a satellite mobile communication system maintains commonality with that of an LTE-based terrestrial mobile communication system, the satellite mobile communication system may reuse an existing terrestrial terminal, resulting in notable economic efficiency. In contrast, when commonality with a terrestrial network is excluded from consideration, a satellite mobile communication system may have reduced overhead of a satellite payload and may be fit for use in a satellite mobile communication environment by using a radio interface suited to a satellite environment. To use satellite and terrestrial services, a terminal needs a dual mode chip embedded in the terminal to support satellite and terrestrial radio interfaces. Accordingly, to ensure interoperability with an LTE-based terrestrial mobile communication system, an LTE-based satellite mobile communication system needs to support an integrated satellite/terrestrial terminal that achieves notable economic efficiency with no additional cost for reuse of an existing terrestrial LTE chipset even though the performance may experience modest degradation, and an integrated satellite/terrestrial terminal that provides a high-quality service suited to a satellite environment through upgrading functions of the terminal, while maintaining commonality with an LTE terrestrial network.

DISCLOSURE OF INVENTION

Technical Goals

An aspect of the present invention is providing a service optimized for satellite mobile communication with reduced overhead of a payload in a satellite mobile communication system while maintaining compatibility with terrestrial mobile communication.

Another aspect of the present invention is supporting a terminal that reuses an existing terrestrial long-term evolution (LTE) chipset and a terminal that enables downlink reception with a low peak to average power ratio (PAPR), by exploiting a proposed downlink transmission method with a low PAPR, robustness to non-linearity of a satellite power amplifier, and compatibility with orthogonal frequency division multiplexing (OFDM).

Still another aspect of the present invention is improving the performance of an integrated satellite/terrestrial mobile communication system in an economically efficient manner by applying a downlink transmission scheme optimized for satellite mobile communication during an interval unavailable for terrestrial mobile communication signal transmission.

Technical Solutions

According to an aspect of the present invention, there is provided a downlink transmission method for an integrated terrestrial/satellite mobile communication system, the method including selecting, by a terminal, a frame, and transmitting communications, by the terminal, using a first downlink transmission scheme within a section of the frame available for downlink signal transmission of terrestrial mobile communication and using a second downlink transmission scheme having a lower peak to average power ratio (PAPR) than the first downlink transmission scheme within a section of the frame unavailable for downlink signal transmission of terrestrial mobile communication.

The terrestrial mobile communication may be based on one selected from the group consisting of long-term evolution (LTE), worldwide interoperability for microwave access (WiMAX), satellite digital multimedia broadcasting (DMB), and digital video broadcasting-satellite service to handhelds (DVB-SH).

The first downlink transmission scheme may correspond to an orthogonal frequency division multiplexing (OFDM) scheme, and the second downlink transmission scheme may correspond to a discrete Fourier transform spread (DFTS)-OFDM scheme.

The frame may correspond to a multimedia broadcast multicast service single frequency network (MBSFN) subframe.

A subframe number of an MBSFN subframe to be transmitted using the second downlink transmission scheme may be obtained by the terminal through a channel used to broadcast system information.

A number of MBSFN subframes to be transmitted using the second downlink transmission scheme may vary based on an amount of downlink transmission data required.

The DFTS-OFDM scheme may include mapping resources for a downlink shared channel (DL-SCH) to continuous resource blocks (RBs), mapping a reference signal (RS) to the mapped RBs, spreading the RS and data using a discrete Fourier transform (DFT) based on a number of subcarriers, and performing an inverse fast Fourier transform (IFFT) on the DFT spread signal and transmitting the output through an antenna.

According to another aspect of the present invention, there is provided an integrated terrestrial/satellite mobile communication terminal including a control unit to obtain downlink transmission information per section of a frame through a physical broadcasting channel from a base station, and a transmitting/receiving unit to recognize communications, based on the downlink transmission information per section of the frame obtained from the control unit, using a first downlink transmission scheme within a section of the frame available for downlink signal transmission of terrestrial mobile communication and using a second downlink transmission scheme having a lower peak to average power ratio (PAPR) than the first downlink transmission scheme within a section of the frame unavailable for downlink signal transmission of terrestrial mobile communication.

The terrestrial mobile communication may be based on one selected from the group consisting of long-term evolution (LTE), worldwide interoperability for microwave access (WiMAX), satellite digital multimedia broadcasting (DMB), and digital video broadcasting-satellite service to handhelds (DVB-SH).

The first downlink transmission scheme may correspond to an orthogonal frequency division multiplexing (OFDM) scheme, and the second downlink transmission scheme may correspond to a discrete Fourier transform spread (DFTS)-OFDM scheme.

The frame may correspond to a multimedia broadcast multicast service single frequency network (MBSFN) subframe.

The downlink transmission information per section of the frame transmitted through the physical broadcasting channel may include at least one a subframe number of an MBSFN subframe and information associated with a downlink transmission scheme.

A number of MBSFN subframes to be transmitted using the second downlink transmission scheme may vary based on an amount of downlink transmission data required.

The DFTS-OFDM scheme may include mapping resources for a downlink shared channel (DL-SCH) to continuous resource blocks (RBs), mapping a reference signal (RS) to the mapped RBs, spreading the RS and data using a discrete Fourier transform (DFT) based on a number of subcarriers, and performing an inverse fast Fourier transform (IFFT) on the DFT spread signal and transmitting the output through an antenna.

Other features and aspects will be apparent from the following detailed description, the drawings, and the claims.

Effects of the Invention

The present invention has an effect of supporting a terminal that reuses an existing terrestrial LTE chipset and a terminal that enables downlink reception with a low peak to average power ratio (PAPR) with no collision between the terminals.

Also, the present invention has an effect of implementing an integrated satellite/terrestrial mobile communication system with a minimum change of an existing mobile communication system to ensure economic efficiency.

BRIEF DESCRIPTION OF DRAWINGS

FIG. 7 is a flowchart illustrating a downlink transmission method with a low PAPR according to an exemplary embodiment.

BEST MODE FOR CARRYING OUT THE INVENTION

Exemplary embodiments propose a downlink transmission method with a low peak to average power ratio (PAPR)

and compatibility with long-term evolution (LTE) in an LTE-based mobile communication system in which the performance degradation may occur due to a high PAPR in multi-carrier transmission caused by non-linearity of a power amplifier in a base station including a satellite.

Figure 1:
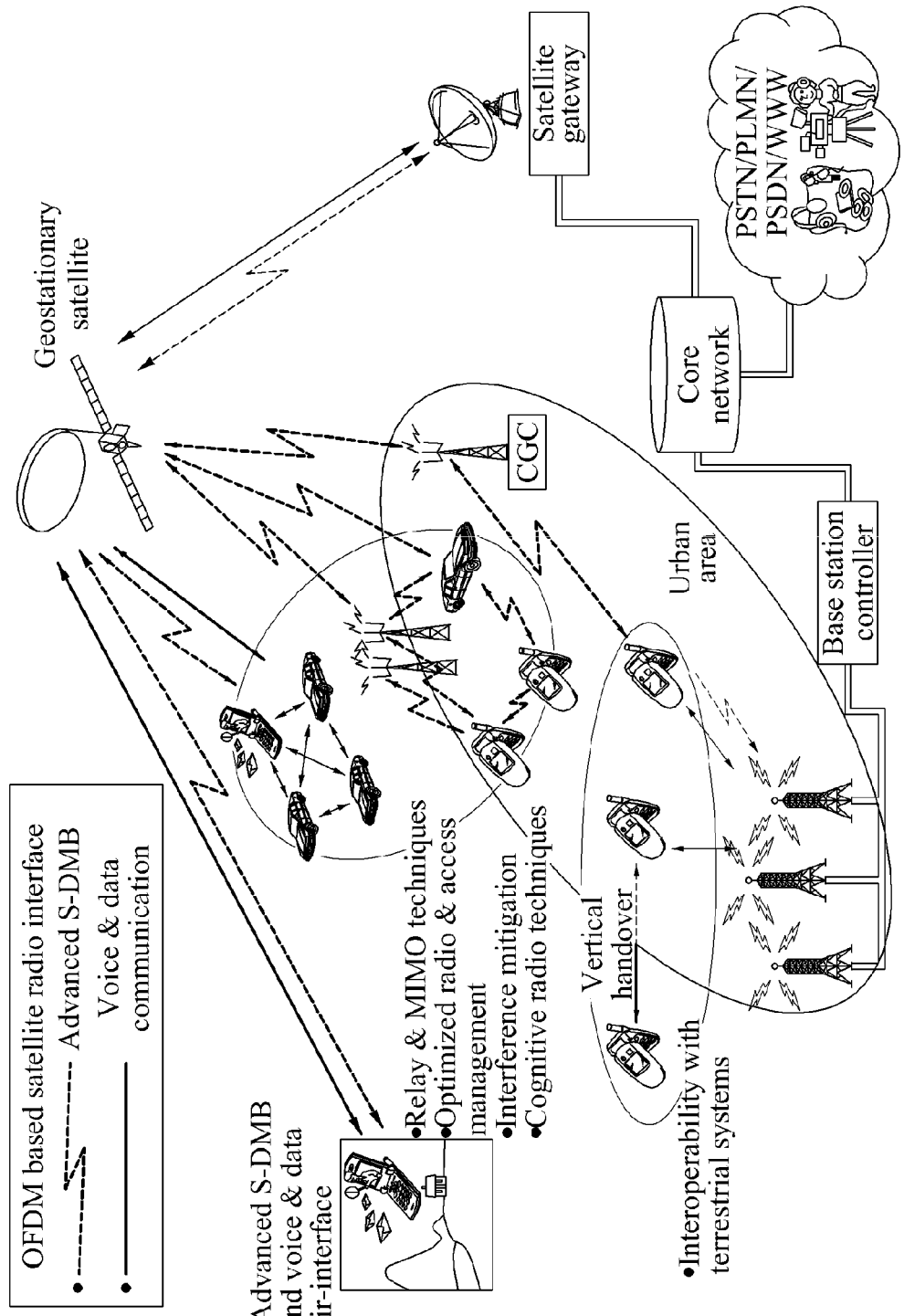
FIG. 1 is a conceptual diagram illustrating a satellite mobile communication system.

Hereinafter, preferred embodiments of the present invention are described in detail with reference to the accompanying drawings. FIG. 1 is a conceptual diagram illustrating a satellite mobile communication system, and although exemplary embodiments describe a downlink transmission method with a low PAPR in a 3rd generation partnership project (3GPP) LTE-based personal satellite mobile communication system having a maximum commonality with a terrestrial system, the method of the present invention may be applicable to satellite access standards for use in satellite environments, for example, satellite digital multimedia broadcasting (DMB) in South Korea, digital video broadcasting-satellite services to handhelds (DVB-SH) in Europe, and the like, as well as terrestrial access standards, for example, orthogonal frequency division multiplexing (OFDM), code division multiple access (CDMA), wideband code division multiple access (WCDMA), time division multiple access (TDMA), frequency division multiple access (FDMA), defined by 3GPP, 3GPP2, the institute of electrical and electronics engineers (IEEE), and the like, in a satellite mobile communication system using an ancillary terrestrial infrastructure such as, for example, a repeater, a complementary ground component (CGC), an ancillary terrestrial component (ATC), and the like. Also, the method of the present invention may be used in the downlink of a mobile communication system having an existing LTE radio interface with a non-optimal performance for downlink.

The system to which the present invention is applicable may include a geostationary (GEO) satellite or a cluster of GEO satellites, and the satellite may include a mono- or multi-spot beam. A region in which a terminal is located may correspond to one spot, and while roaming, may correspond to a plurality of spots. Mobile satellite terminals may be connected to one another over a network through one or more satellites connected to a gateway directly. In the system, the gateway may be one selected from a group consisting of a centralized gateway and a geographically distributed gateway based on the requirements of a service provider.

Although not shown in FIG. 1, the gateway may transfer a signal to a network sub-system including a satellite base station and a satellite controller. Here, the satellite base station and the satellite controller may have the same function as a base station and a controller being used in a terrestrial network, and may be located inside or outside of the gateway. Also, the system may amplify and transmit a satellite signal on the same frequency as the satellite using an ancillary terrestrial infrastructure as an available option, to ensure coverage continuity in a shadow area in which signal transmission fails in a satellite environment due to obstruction, for example, buildings, mountains, and the like.

In the system of FIG. 1, a broadcasting service or multimedia broadcast/multicast services (MBMS) may be provided through a satellite and an ancillary terrestrial infrastructure. In a wide coverage area in which a clear line of sight (LoS) is established, for example, suburbs or rural areas, an MBMS service may be provided through a satellite, and in a narrow coverage area in which a direct signal path from a satellite is obstructed by buildings or structures, for example, cities or indoor environments, a broadcasting service may be provided through an ancillary terrestrial infrastructure. Generally, a transponder works only for downlink transmission since the transponder fails to provide voice and data communication services, and to provide an MBMS service, transmits information for the MBMS service via a terrestrial network. Due to limited frequency resources, it is impossible to provide voice and data communication services to all users within a very great coverage of a satellite beam, and thus, the contemplated system model provides voice and data communication services, in principle, to only a small number of users located in a non-terrestrial coverage area within a service area contemplated by the system.

However, in an area failed to be covered by a terrestrial network and a direct signal path from a satellite is obstructed, the ancillary terrestrial infrastructure may transmit an uplink signal for voice and data communication or MBMS to the satellite when needed, as shown in FIG. 1. According to the system model of FIG. 1, a terminal may be provided with voice and data communication services through a satellite in a non-terrestrial coverage area, and when entering a terrestrial network coverage area, may be provided with the services again through a terrestrial network having a high transmission efficiency, which is termed a vertical handover, and in this case, the terminal needs to receive a terrestrial network signal and a satellite network signal, but when the terrestrial network and the satellite network use different standards, a chip overhead of the terminal may increase, and accordingly, although not shown in FIG. 1, the system may use an OFDM-based satellite radio interface having a maximum commonality with an OFDM-based terrestrial 3GPP LTE radio interface. Also, the satellite mobile communication system of FIG. 1 may improve the data transmission capacity and the reception performance by applying a multiple-input multiple-output (MIMO) technique exploiting a satellite multi-beam, at least two satellites, or antenna polarization, and may obtain a spatial diversity gain with the effect of slow fading from a satellite through cooperative communication using a terrestrial auxiliary infrastructure and an ad-hoc network configuration between terminals, which is impossible to be obtained with a conventional multi-antenna technique. Furthermore, a total system throughput may be improved by applying techniques for utilizing frequencies effectively.

As such, a personal satellite mobile communication system being contemplated aims to provide a service through a satellite in an area in which a clear LoS is established, for example, suburbs or rural areas, and through an ancillary terrestrial infrastructure in an area in which a direct signal path from a satellite is obstructed, for example, cities or indoor environments. To reduce a chipset overhead of a terminal, it is important to ensure commonality between a satellite radio interface and a terrestrial radio interface. In particular, taking into account a current market circumstance in which a satellite mobile communication service complements a terrestrial mobile communication service in a non-terrestrial area or state rather than competing against a terrestrial mobile communication service, a satellite radio interface may hold a dominant position in an initial market when the satellite radio interface provides a satellite mobile communication service in a complementary relationship with a terrestrial network absent upgrading a terrestrial terminal while maintaining a maximum commonality with a terrestrial network. When commonality with a terrestrial network is taken into consideration, a chipset overhead of a terminal may be reduced but the terminal may fail to use an enhanced technology for a satellite mobile communication service, and a satellite may need high power and a signal processing technology. This may work on an overhead of a satellite payload and may limit a total capacity of a satellite mobile communication system. In contrast, when commonality with a terrestrial network is excluded from consideration, a satellite mobile communication system may reduce an overhead of a satellite payload using an optimal transmission technique for a satellite environment and may suit the system for a satellite mobile environment. However, to use satellite and terrestrial mobile communication services, a terminal may need a dual mode chip embedded in the terminal to support satellite and terrestrial radio interfaces. In this instance, an overhead of the terminal may increase. This approach may fail to provide a satellite mobile communication service with a competitive advantage over a terrestrial network in an initial market because it is expected that a terrestrial service user is reluctant to change a terrestrial terminal in use at an initial stage of a satellite mobile communication service. However, when the satellite mobile communication service market grows to some extent, it is expected that a total number of users will increase. Accordingly, to meet the demand for a high quality service from satellite mobile communication service users, an increase in system capacity through improvement of the system may be required. In this case, it is expected that a radio interface suitable for a satellite environment may become more advantageous because the demand for an optimal radio interface for a satellite mobile communication environment will be increasingly in demand.

In conclusion, an LTE-based satellite mobile communication system being contemplated needs to support an integrated satellite/terrestrial terminal that achieves notable economic efficiency with no additional cost by reuse of an existing terrestrial LTE chipset even through the performance may experience modest degradation and an integrated satellite/terrestrial terminal that provides a high-quality service suited to a satellite environment through upgrading functions of the terminal, while maintaining commonality with an LTE terrestrial network.

Accordingly, exemplary embodiments propose a downlink transmission method with a low PAPR, robustness to non-linearity of a satellite power amplifier, and compatibility with OFDM-based downlink transmission. That is, to facilitate the attraction of a terrestrial service user into an initial market, the method may provide a service through a satellite radio interface having commonality with a terrestrial network. In a mature market, the method may support downlink transmission with a low PAPR and LTE-based downlink transmission to improve the capacity of a satellite mobile communication system.

For this purpose, the proposed communication method envisages a frame structure designed to support a user terminal enabling downlink transmission with a low PAPR based on a frame structure of an existing satellite radio interface contemplated in an initial market while avoiding the influence on an existing radio interface user so that a satellite radio interface having commonality with a terrestrial radio interface may use an optimal communication scheme for a satellite environment absent a change of a terminal and a system.

Hereinafter, a description of a basic communication method for supporting an LTE-based terrestrial mobile communication terminal and an integrated terrestrial/satellite mobile communication terminal while maintaining compatibility between the two terminals is provided. This communication method may be characterized by a terminal selecting a frame, and transmitting communications using a first downlink transmission scheme within a section of the frame available for downlink transmission of terrestrial mobile communication and using a second downlink transmission scheme having a lower PAPR than the first downlink transmission scheme within a section of the frame unavailable for downlink transmission of terrestrial mobile communication.

More specifically, information associated with a section disallowing a user terminal using an LTE downlink transmission scheme to transmit communications may be transmitted through a channel or a signal used to broadcast a section including system information. The user terminal using an LTE downlink transmission scheme may acquire information associated with a frame or a section of a frame unavailable for the user terminal from system information when the user terminal initially accesses a satellite system, and may acquire control information or a reference signal for channel estimation from the remaining section aside from the unavailable section. The integrated terrestrial/satellite mobile communication terminal of the present invention enabling downlink transmission with a low PAPR may acquire information associated with a frame or a section of a frame unavailable for a user terminal using an LTE downlink transmission scheme through allocated system information of an existing radio interface and may enable downlink transmission with a low PAPR through the section, to provide an enhanced service and improve the system capacity. In the envisaged frame structure, downlink transmission with a low PAPR may be implemented absent interference with an LTE signal transmission through a section in which the LTE signal transmission fails because of allocation to a user terminal using an LTE downlink transmission scheme being impossible, to support a user terminal enabling downlink transmission with a low PAPR and a user terminal enabling LTE signal transmission, so that downlink transmission with a low PAPR may be supported flexibly absent influencing on a service of an existing terminal.

Also, exemplary embodiments propose a predetermined frame structure for supporting a terrestrial LTE mobile communication terminal and an integrated terrestrial/satellite mobile communication terminal while maintaining compatibility with LTE mobile communication terminal, and a method of using the same.

To provide a satellite service through a terrestrial terminal enabling LTE signal transmission, a satellite radio interface needs to apply a frame structure for a 3GPP LTE radio interface absent modification. Accordingly, a user terminal enabling LTE signal transmission may be provided with a communication service using a frame structure for a 3GPP LTE radio interface. When a user terminal enabling downlink transmission with a low PAPR is used in a satellite system, the user terminal enabling LTE signal transmission needs to be provided with a service in a conventional manner absent recognizing a user terminal enabling downlink transmission with a low PAPR. The user terminal enabling downlink transmission with a low PAPR needs to be provided with an enhanced service absent influencing on a user terminal enabling LTE signal transmission. For this purpose, a method using an MBMS single frequency network (MBSFN) subframe introduced into LTE is proposed. Here, MBSFN is an example for illustrating the proposed frame and may have a different configuration, and an LTE system is provided as an exemplary system for helping the understanding of the proposed invention and may include broadcasting and communication systems. The LTE MBSFN subframe may have the following characteristics. Subframes 0, 4, 5, and 9 may be unfit to serve as an MBSFN subcarrier since the subframes 0, 4, 5, and 9 are used in measurement for radio resource management (RRM) and paging. In the MBSFN subframe, one or two OFDM symbols may be used for a control channel based on the antenna configuration. In this instance, transmitting a common reference signal (CRS) and a control channel such as, for example, a physical control format indicator channel (PCFICH), a physical hybrid-ARQ indicator channel (PHICH), and a physical downlink control channel (PDCCH), through all the subframes over the whole bandwidth in the LTE signal transmission is mandatory, and since the CRS is used for all users to estimate a channel and a transmission power is fixed, it is essential for a user terminal enabling downlink transmission with a low PAPR to be taken into consideration when allocating an LTE signal transmission frame.

Accordingly, a satellite mobile communication system may use the same transmission frame as that of an LTE communication method only for a user terminal enabling LTE signal transmission and may maintain a frame structure for an existing LTE radio interface contemplated in an initial market. When a user wants to receive an enhanced service or when there is a demand for increasing system capacity with an increasing number of users, a satellite mobile communication system may allocate an MBSFN subframe of an existing LTE radio interface to support a user terminal enabling downlink transmission with a low PAPR as well as a user terminal enabling LTE transmission. The satellite mobile communication system may allocate the remaining MBSFN subframes aside from the MBSFN subframes 0, 4, 5, and 9. A subframe number of the allocated subframe may be known through a physical broadcast channel (PBCH) used to broadcast system information transmitted from an existing radio interface, and a number of subframes to be allocated may be determined flexibly by the satellite mobile communication system based on the requirements of a user terminal enabling LTE signal transmission and a user terminal enabling downlink transmission with a low PAPR. When the satellite mobile communication system allocates MBSFN subframes, a user terminal enabling LTE signal transmission may transmit and receive data through other subframes aside from the MBSFN subframes because the user terminal fails to acquire data of the MBSFN subframes recognized through system information. However, the user terminal enabling LTE signal transmission may acquire information associated with a control channel transmitted through first one or two OFDM symbols of the MBSFN subframes varying based on antenna configuration for uplink allocation grant information, and may estimate a channel through a CRS included in the first one or two OFDM symbols of the MBSFN subframes. However, since the subframes 0, 4, 5, ad 9 are required to use a CRS for RRM measurement or paging, the subframes may be unqualifiable as an MBSFN subframe. In contrast, a user terminal enabling downlink signal transmission with a low PAPR may acquire a number of MBSFN subframes and a subframe number of an allocated subframe using system information acquired through a control channel, such as a PBCH, of an existing radio interface. The user terminal enabling downlink signal transmission with a low PAPR may only transmit and receive data through the MBSFN subframes, and since first one or two OFDM symbols of the MBSFN subframes are used for a control channel and a CRS for an existing user terminal based on antenna configuration which disenables downlink signal transmission with a low PAPR, a frame structure may be designed to enable downlink signal transmission with a low PAPR using a next OFDM symbol.

When an existing MBSFN subframe is used, an existing LTE radio interface may be reused absent modification, however, there is a limitation on system capacity due to failure to use the subframes 0, 4, 5, and 9 of an existing LTE radio interface that are unqualifiable as an MBSFN subframe when a number of user terminals enabling downlink transmission with a low PAPR increases. To resolve this issue, a method using an MBSFN subframe flexibly with varying amounts of downlink transmission data required by modifying a frame structure of a terrestrial 3GPP LTE radio interface is proposed. As described in the foregoing, a terminal enabling LTE signal transmission may use a CRS of subframes 0 and 5 for RRM measurement and the subframes 0, 4, 5, and 9 for paging. Here, when the CRS of the subframes 0 and 5 are only used for paging, a flexible radio interface transition may be implemented by increasing a number of available MBSFN subframes through reduction of paging performance.

Figure 2:
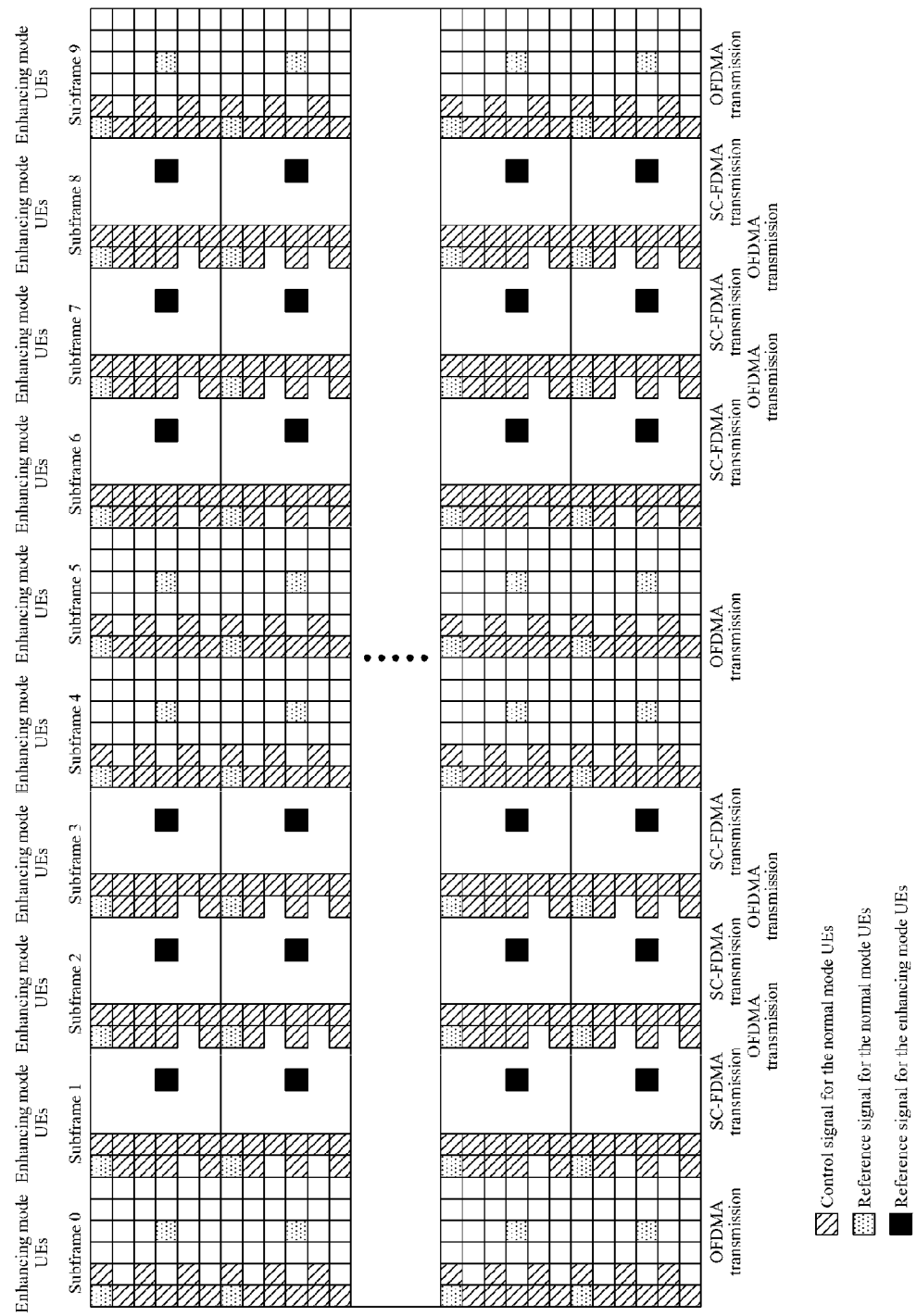
FIGS. 2 and 3 are diagrams illustrating a frame structure of an LTE frame for supporting a long-term evolution (LTE)-based terrestrial mobile communication terminal and an integrated terrestrial/satellite mobile communication terminal using a multimedia broadcast multicast service single frequency network (MBSFN) subframe, while maintaining compatibility with the LTE-based terrestrial mobile communication terminal.
Figure 3:
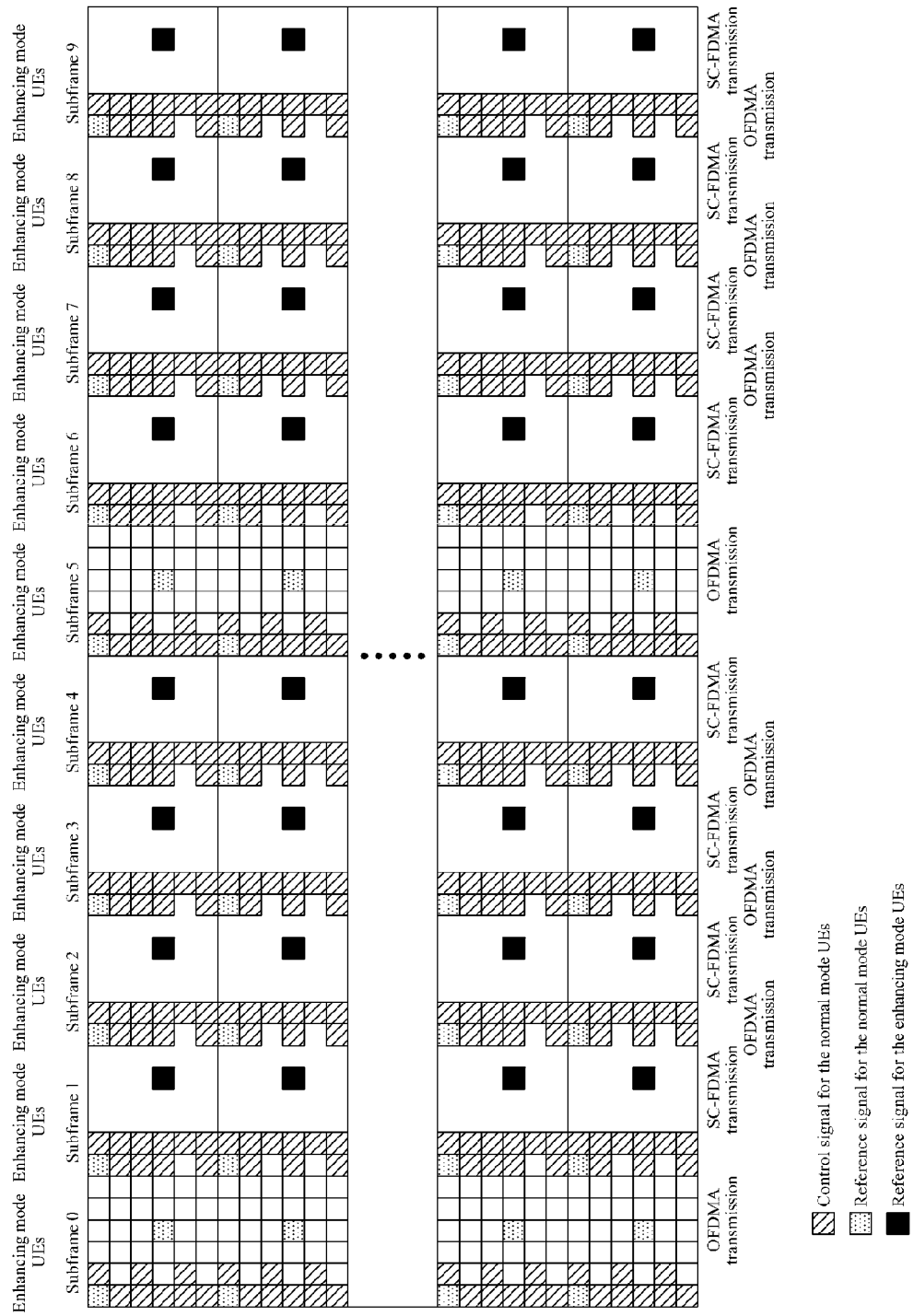
Figure 4:
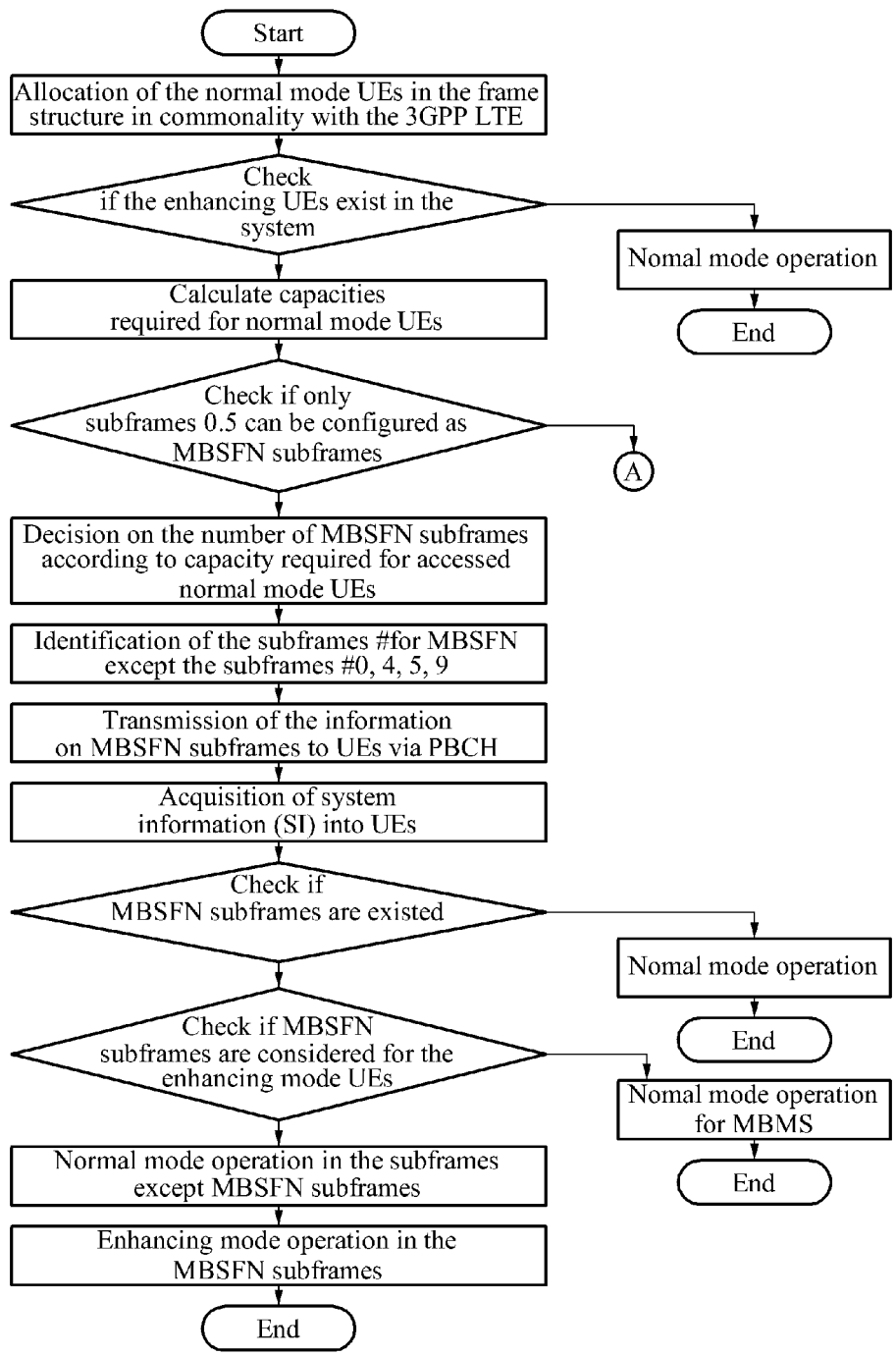
FIG. 4 is a flowchart illustrating a communication method for supporting an LTE-based terrestrial mobile communication terminal and an integrated terrestrial/satellite mobile communication terminal using an MBSFN subframe in an LTE frame, while maintaining compatibility with the LTE-based terrestrial mobile communication terminal.
Figure 5:
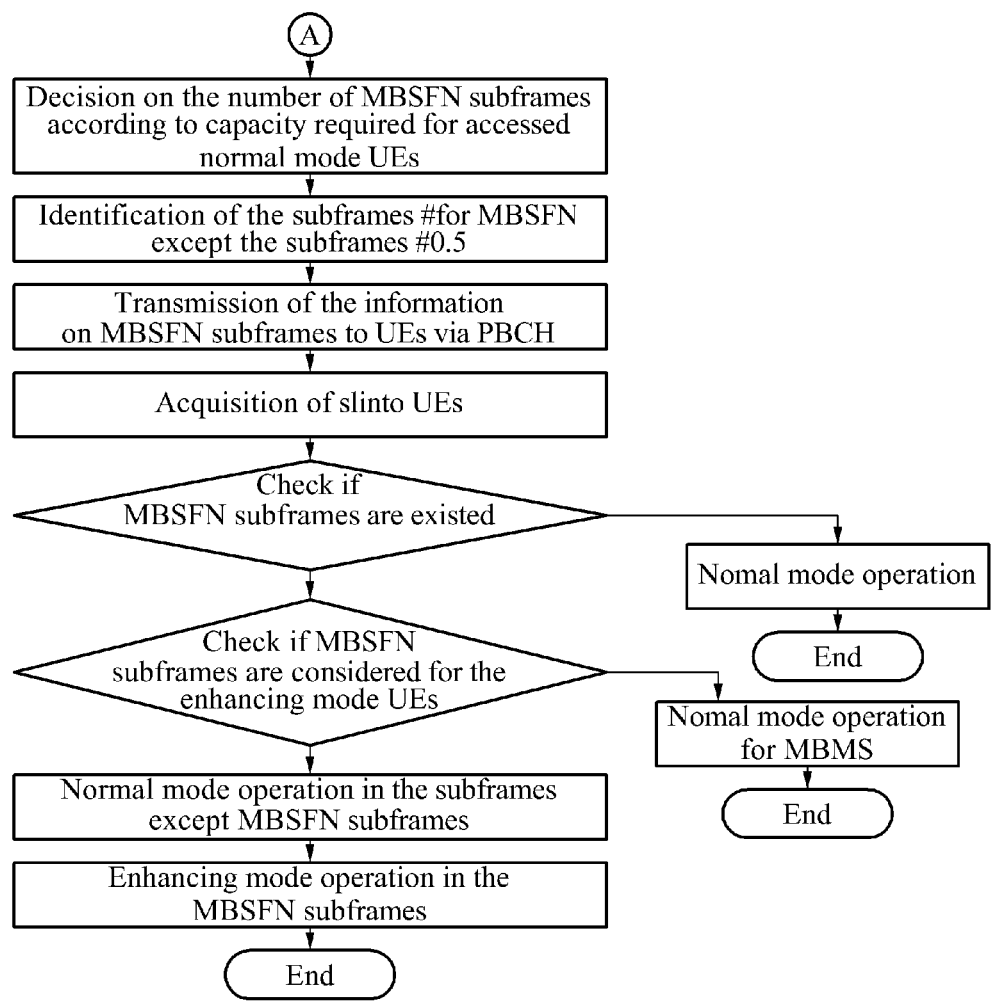
FIG. 5 is a flowchart related to A of FIG. 4.

FIGS. 2 through 4 show a frame structure for supporting an LTE-based terrestrial mobile communication terminal and an integrated terrestrial/satellite mobile communication terminal while maintaining compatibility with LTE based on an existing LTE frame structure using an MBSFN subframe described in the foregoing, and a flowchart illustrating a communication method therefor.

In FIG. 2, subframes 1, 2, 3, 6, 7, and 8 may be assigned as an MBSFN subcarrier and the subframes 0, 4, 5, and 9 may be assigned as a unicast subframe for a terminal enabling LTE signal transmission. In FIG. 3, the subframes 1, 2, 3, 4, 6, 7, 8, and 9 may be assigned as an MBSFN subcarrier and the subframes 0 and 5 may be assigned as a unicast subframe for a terminal enabling LTE signal transmission. A number of MBSFN subframes may be determined flexibly and properly to meet the satellite system requirements. In the flowchart of FIG. 4, a procedure of communication method for supporting a user terminal enabling LTE signal transmission and a user terminal enabling downlink transmission with a low PAPR may be changed flexibly and properly.

Also, exemplary embodiments propose a second downlink transmission scheme having a lower PAPR than a first downlink transmission scheme being used for terrestrial mobile communication such as LTE.

In the multicarrier-based signal transmission, many technologies for reducing a PAPR have been suggested. However, the suggested technologies require modification to an existing LTE downlink transmission scheme, such as, for example, an additional pilot, a feedback channel, and the like. Accordingly, exemplary embodiments propose a downlink transmission scheme with a low PAPR and compatibility with LTE as well as a reduced terminal chipset overhead by the reuse of an existing LTE downlink transmission block.

In LTE, OFDM downlink transmission may be used, and a flow of transmission is as follows. A cyclic redundancy check (CRC) used for error detection at a receiving end may be attached to a transmission block to be transmitted through a downlink shared channel (DL-SCH), and turbo coding for error correction may be performed subsequently. In a case of spatial diversity, this process may be performed twice for each transmission block. Rate matching may be used to construct different redundancy versions being controlled by a hybrid automatic repeat request (HARQ) as well as to match a number of coded bits to an amount of resources allocated for DL-SCH transmission. Subsequent to rate matching, the encoded bits may be modulated using quadrature phase shift keying (QPSK), 16-quadrature amplitude modulation (QAM), 64-QAM, and the like, followed by antenna mapping. The antenna mapping may be set to provide different multi-antenna transmission schemes including transmit diversity, beamforming, and spatial diversity. Finally, an output of antenna processing may be mapped to physical resources for a DL-SCH. The resources as well as a size of the transmission block and the modulation scheme may be controlled by a scheduler. The signal mapped with the physical resources may undergo an inverse fast Fourier transform (IFFT) and CP insertion, and may be transmitted as an OFDM signal through each antenna. To reduce a terminal chipset overhead by the reuse of an existing LTE transmission block while maintaining compatibility with LTE, downlink transmission with a low PAPR needs to maintain the transmission block of OFDM downlink transmission in LTE, as described in the foregoing. Here, a size of a transmission block to be transmitted through a DL-SCH needs to be identical to that of LTE signal transmission, and CRC attachment, turbo coding, rate matching, and resource mapping need to be identical to those of LTE and these steps are to be performed in the same order as those of LTE.

Figure 6:
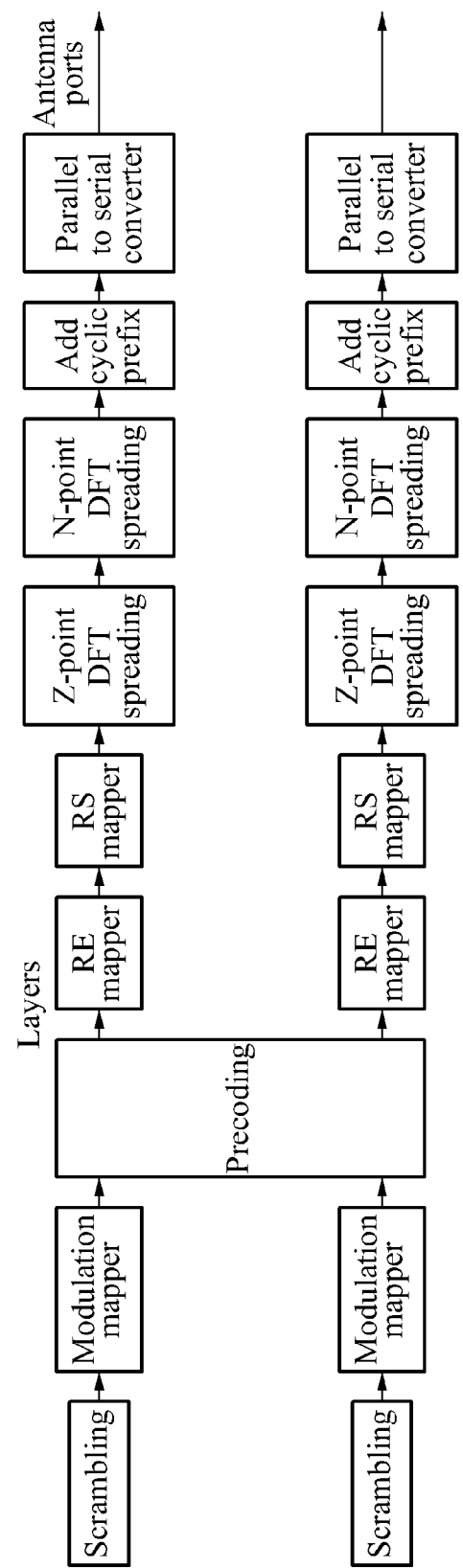
FIG. 6 is a diagram illustrating a downlink transmission block with a low peak to average power ratio (PAPR) according to an exemplary embodiment.

FIGS. 6 and 7 illustrate a downlink transmission block and a communication method for downlink transmission with a low PAPR. For this purpose, a discrete Fourier transform (DFT) spreading may be interposed between resource mapping and IFFT while maintaining an LTE signal transmission block. In the same manner as the uplink LTE, DFT spreading allows multi-subcarrier transmission having single subcarrier properties prior to IFFT. To ensure compatibility with LTE, a resource location of a signal for IFFT to be transmitted in LTE needs to be identical to a resource location of a DFT spread signal, and to maintain the single subcarrier properties, a base station scheduler needs to allocate data and a reference signal (RS) to a resource block (RB) to be mapped continuously because the DFT spread signal needs to be input for IFFT continuously. In this instance, there is a limitation on flexible resource allocation in the frequency domain. However, since a mobile communication network having frequency non-selective channel characteristics such as a satellite mobile communication network does not have a great gain in the frequency domain resource allocation, modest performance deterioration is present even though the scheduler allocates each user data to continuous resource blocks. Accordingly, the proposed downlink transmission method with a low PAPR may attach a CRC for error detection at a receiving end to a transmission block to be transmitted through a DL-SCH in accordance with an existing LTE transmission scheme, followed by turbo coding for error correction. In a case of spatial diversity, this process may be performed twice for each transmission block. Rate matching may be used to construct different redundancy versions being controlled by a HARQ as well as to match a number of coded bits to an amount of resources allocated for DL-SCH transmission. Subsequent to rate matching, the encoded bits may be modulated using QPSK, 16-QAM, 64-QAM, and the like, followed by antenna mapping. The antenna mapping may be set to provide different multi-antenna transmission schemes including transmit diversity, beamforming, and spatial diversity. Finally, an output of antenna processing may be mapped to physical resources for the DL-SCH. The mapping of the physical resources may be implemented such that the scheduler allocates the resources to conduct all the DL-SCH resource mapping contemplated in downlink transmission over the continuous resource blocks, and reference signal mapping may be executed on only a resource block having undergone DL-SCH resource mapping. Accordingly, the overall data and reference signals may be allocated to subcarriers continuously without omission, Z-point DFT spreading may be performed based on a number of resource blocks mapped with the overall data and reference signals, for example, a number Z of subcarriers required to allocate data and reference signals, and the number Z of signals generated may be input to N-point IFFT determined based on a signal bandwidth, in particular, to a location in which the data and reference signal prior to DFT spreading is mapped.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The computer readable recording medium may include any data storage device that can store data which can be thereafter read by a computer system or processing device. Examples of the computer readable recording medium include read-only memory (ROM), random-access memory (RAM), CD-ROMs, magnetic tapes, floppy discs, optical data storage devices. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

The invention claimed is:

1. A downlink transmission method for an integrated terrestrial/satellite mobile communication system, the method comprising:
   selecting, by a mobile terminal, a frame; and
   receiving, by the mobile terminal, a first section of the frame that is transmitted using an orthogonal frequency division multiplexing (OFDM) scheme during the transmission of the first section of the frame that is available for downlink signal transmission of terrestrial mobile communication; and
   receiving, by the mobile terminal, a second section of the frame that is transmitted using a discrete Fourier transform spread (DFTS)-OFDM scheme that a discrete Fourier transform (DFT) spreading is interposed between resource mapping and inverse fast Fourier transform (IFFT), the DFTS-OFDM scheme having a lower peak to average power ratio (PAPR) than the OFDM scheme during the transmission of the second section of the frame that is unavailable for the downlink signal transmission of the terrestrial mobile communication,
   wherein the frame includes a plurality of first subframes for multicast service and a plurality of second subframes for unicast service.

2. The method of claim 1, wherein the terrestrial mobile communication is based on one selected from the group consisting of long-term evolution (LTE), worldwide interoperability for microwave access (WiMAX), satellite digital multimedia broadcasting (DMB), and digital video broadcasting-satellite service to handhelds (DVB-SH).

3. The method of claim 1, wherein the first subframe corresponds to a multimedia broadcast multicast service single frequency network (MBSFN) subframe.

4. The method of claim 3, wherein the mobile terminal obtains a subframe number of MBSFN subframes to be transmitted using the DFTS-OFDM scheme from a channel used to broadcast system information.

5. The method of claim 3, wherein a number of MBSFN subframes to be transmitted using the DFTS-OFDM scheme varies based on an amount of downlink transmission data required.

6. The method of claim 1, wherein information indicating the second section of the frame is included in system information.

7. The method of claim 1, wherein the DFTS-OFDM scheme comprises:
   mapping resources for a downlink shared channel (DL-SCH) to continuous resource blocks (RBs);
   mapping a reference signal (RS) to the mapped RBs;
   spreading the RS and data using a discrete Fourier transform (DFT) based on a number of subcarriers; and
   performing an inverse fast Fourier transform (IFFT) on the DFT spread signal and transmitting the output through an antenna.

8. An integrated terrestrial/satellite mobile communication terminal, comprising:
   a control unit to obtain downlink transmission information per section of a frame through a physical broadcasting channel from a base station; and
   a transmitting/receiving unit to recognize communications, based on the downlink transmission information per section of the frame obtained from the control unit, receive a first section of the frame that is transmitted using an orthogonal frequency division multiplexing (OFDM) scheme during the transmission of the first section of the frame that is available for downlink signal transmission of terrestrial mobile communication, and receive a second section of the frame that is transmitted using a discrete Fourier transform spread (DFTS)-OFDM scheme that a discrete Fourier transform (DFT) spreading is interposed between resource mapping and inverse fast Fourier transform (IFFT), the DFTS-OFDM scheme having a lower peak to average power ratio (PAPR) than the OFDM scheme during the transmission of the second section of the frame that is unavailable for the downlink signal transmission of the terrestrial mobile communication,
   wherein the frame includes a plurality of first subframes for multicast service and a plurality of second subframes for unicast service.

9. The integrated terrestrial/satellite mobile communication terminal of claim 8, wherein the terrestrial mobile communication is based on one selected from the group consisting of long-term evolution (LTE), worldwide interoperability for microwave access (WiMAX), satellite digital multimedia broadcasting (DMB), and digital video broadcasting-satellite service to handhelds (DVB-SH).

10. The integrated terrestrial/satellite mobile communication terminal of claim 8, wherein the first subframe corresponds to a multimedia broadcast multicast service single frequency network (MBSFN) subframe.

11. The integrated terrestrial/satellite mobile communication terminal of claim 10, wherein the downlink transmission information per section of the frame transmitted through the physical broadcasting channel includes at least one of a subframe number of MBSFN subframes to be transmitted using the DFTS-OFDM scheme and information associated with a downlink transmission scheme.

12. The integrated terrestrial/satellite mobile communication terminal of claim 11, wherein a number of MBSFN subframes to be transmitted using the DFTS-OFDM scheme varies based on an amount of downlink transmission data required.

13. The integrated terrestrial/satellite mobile communication terminal of claim 8, wherein the DFTS-OFDM scheme comprises:
   mapping resources for a downlink shared channel (DL-SCH) to continuous resource blocks (RBs);
   mapping a reference signal (RS) to the mapped RBs;
   spreading the RS and data using a discrete Fourier transform (DFT) based on a number of subcarriers; and
   performing an inverse fast Fourier transform (IFFT) on the DFT spread signal and transmitting the output through an antenna.

14. The integrated terrestrial/satellite mobile communication terminal of claim 8, wherein information indicating the second section of the frame is included in system information.

* * * * *